United States Patent [19]
Nagashima

[11] 4,141,064
[45] Feb. 20, 1979

[54] BOOSTER CIRCUIT

[75] Inventor: Shinichi Nagashima, Suwa, Japan

[73] Assignee: Kabushiki Kaisha Suwa Seikosha, Tokyo, Japan

[21] Appl. No.: 855,573

[22] Filed: Nov. 29, 1977

[30] Foreign Application Priority Data

Nov. 29, 1976 [JP] Japan .................................. 51/143833

[51] Int. Cl.$^2$ ............................................. H02M 7/00
[52] U.S. Cl. .................................. 363/60; 307/DIG. 4
[58] Field of Search .................. 58/23 BA, 152 H; 307/DIG. 4, 246; 363/59, 60

[56] References Cited

U.S. PATENT DOCUMENTS

| | | | |
|---|---|---|---|
| 3,824,447 | 7/1974 | Kuwabara | 307/DIG. 4 X |
| 3,997,832 | 12/1976 | Tanaka et al. | 363/60 |
| 4,029,973 | 6/1977 | Kobayashi et al. | 307/DIG. 4 X |
| 4,061,929 | 12/1977 | Asano | 307/DIG. 4 X |

*Primary Examiner*—William M. Shoop
*Attorney, Agent, or Firm*—Blum, Moscovitz, Friedman & Kaplan

[57] ABSTRACT

A booster circuit for use in a miniaturized battery operated electronic instrument such as an electronic wristwatch is provided. The booster circuit includes a first capacitor and a second capacitor. A switching circuit is adapted to be disposed in a first operative mode and thereby apply a supply voltage produced by a battery to a first capacitor and thereby charge same to a first voltage. The switching circuit is further adapted to be disposed in a second operative mode to apply the supply voltage and the first voltage stored in the first capacitor in the second capacitor to produce a predetermined output voltage for driving a load substantially equal to the sum of the supply voltage and the first voltage stored in the first capacitor. The booster circuit is characterized by a load detector for producing a load detection signal in response to a change in the load driven by the output voltage. Additionally, an impedance control circuit is coupled to the switching circuit for controlling the impedance of the switching circuit in response to the load detection signal being applied thereto so that the current consumed by the booster circuit is varied in response to the load detection signal.

10 Claims, 7 Drawing Figures

BOOSTER CIRCUIT

BACKGROUND OF THE INVENTION

This invention is directed to a booster circuit for use in a small-sized battery operated electronic instrument, such as an electronic wristwatch, and in particular to a booster circuit that is capable of producing a predetermined output voltage by consuming additional current when the load driven by the output voltage of the booster circuit varies.

In miniaturized electronic instruments, such as electronic wristwatches, a DC battery is utilized as the only voltage supply. Accordingly, the battery should have a large capacity yet be small in size. To this end, miniaturized silver batteries, or mercury batteries, are utilized in most electronic wristwatches now being manufactured. Nevertheless, one disadvantage of utilizing silver or mercury batteries is the low voltage delivered thereby, thereby rendering it necessary to utilize more than one battery or, alternatively, to utilize a booster circuit in order to drive the electronic timepiece circuitry. Although it is easy to increase the voltage delivered by the power supply by increasing the number of batteries, the increased number of batteries requires a corresponding increase in the size of the wristwatch, and accordingly from a standpoint of miniaturization, a booster circuit is preferred.

Nevertheless, in order to effectively utilize a booster circuit, it is important that the current consumption of the booster circuit be minimized in order to prevent the battery from being unnecessarily dissipated thereby. It is noted, however, that the reduced current consumption obtained by a booster circuit must be balanced against the necessity of producing a predetermined output voltage for driving the electronic wristwatch when a maximum load is placed upon the voltage supply for a short interval of time. Such sudden increases in the power required to operate an electronic wristwatch are a result of the improved integrated circuit techniques and electro-optical display techniques that have, in recent years, permitted miniaturized electronic wristwatches to function as a stopwatch, a calculator, etc., without any loss in accuracy or size. Nevertheless, when an electronic wristwatch performs an additional function, a considerable load is placed upon the voltage supply, thereby causing the booster circuit that had heretofore been designed for minimum current consumption to be unable to produce a sufficient output voltage for driving the additional load placed upon the voltage supply. Accordingly, a booster circuit wherein the current consumed is varied, in response to a change in the load driven by the output voltage produced by the booster circuit, is desired.

SUMMARY OF THE INVENTION

Generally speaking, in accordance with the instant invention, a booster circuit for use in a small-sized battery operated electronic instrument, such as an electronic wristwatch, is provided. A battery is provided for producing a predetermined supply voltage. The booster circuitry is comprised of a first capacitor, a second capacitor and a switching circuit adapted to be disposed in a first operative mode to apply the supply voltage produced by the battery to the first capacitor and thereby charge same to a first voltage. The switching circuit is further adapted to be disposed in a second mode for applying the supply voltage and the first voltage stored in the first capacitor to the second capacitor to produce a predetermined output voltage for driving a load substantially equal to the sum of the supply voltage and the first voltage stored in the first capacitor. The invention is particularly characterized by a load detector for producing a load detecting signal in response to a change in the load driven by the output voltage. An impedance circuit is coupled to the switching circuit for controlling the impedance of the switching circuit in response to the load detecting signal being applied thereto whereby the current consumed by the booster circuit is varied in response to the load detection signal.

In a first embodiment of the instant invention, the impedance circuit includes a second switching circuit adapted to be selectively coupled in parallel with the first switching circuit when the load detection signal is applied thereto, to thereby reduce the resistance provided by the first switching circuit and, hence, increase the current consumed by the booster circuit. In a further embodiment of the instant invention, the impedance circuit is coupled to the switching circuit and applies a higher frequency signal thereto, to thereby decrease the impedance of the first switching circuit and thereby increase the current consumed by the booster circuit in response to the load detection signal being applied thereto.

Accordingly, it is an object of the instant invention to provide an improved booster circuit for a small-sized battery operated miniaturized electronic instrument, such as an electronic wristwatch.

A further object of the instant invention is to provide a booster circuit capable of producing a predetermined output voltage for driving a load in response to changes in the load driven by the output voltage.

Still a further object of the instant invention is to provide a booster circuit that admits of increased current consumption and, hence, reduced impedance when the load, driven thereby, is increased.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
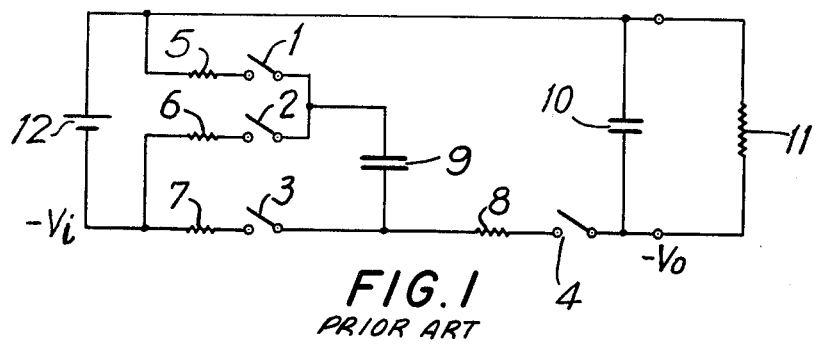
FIG. 1 is an equivalent circuit diagram of a booster circuit constructed in accordance with the prior art.
Figure 2:
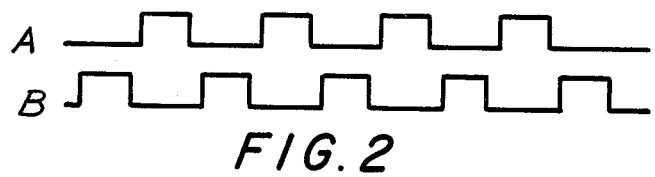
FIG. 2 is a wave diagram illustrating the operation of the booster circuit depicted in FIG. 1.

Reference is now made to FIG. 1, wherein an equivalent circuit diagram of a booster circuit, comprised of MOS switching transistors, is depicted. The switches 1 through 4, and the resistors 5 through 8 respectively represent the equivalent of MOS switching transistors. Specifically, as is illustrated in FIG. 2, when the signal A is a HIGH level signal and is applied to switches 1 and 3, switches 1 and 3 are closed, to thereby define a closed loop including voltage supply 12, switch 1, capacitor 9 and switch 3, to thereby charge the capacitor 9 to a voltage substantially equal to the supply voltage $-V_i$. When the drive signal B is a HIGH level signal and is applied to switches 2 and 4, switches 2 and 4 are closed to thereby define a circuit including voltage supply 12, capacitor 10, switch 4, capacitor 9 and switch 2, which circuit causes a voltage equal to the sum of the supply voltage $-V_i$ and the voltage stored in the capacitor 9 to be supplied to the capacitor 10 and thereby charge same to a voltage for driving a load. Accordingly, if the switches 1 through 4 were ideal switches, thereby causing the resistance of resistors 5 through 8 to be zero, the output voltage $-V_o$ would be equal to $-2V_i$.

It is noted, however, that in an actual circuit, when the switches 1 through 4 are MOS switching transistors, the resistance represented by resistors 5 through 8 equals the channel resistance of the MOS transistor when same is turned ON. Additionally, the resistance 11 represents the load to be driven by the output voltage and thereby renders the magnitude of the output voltage $V_o$ smaller than $2V_i$. Nevertheless, the magnitude of the output voltage $V_o$ should always be greater than the magnitude of the voltage required to drive any load and, in order to obtain this result, the capacitance of the capacitors 9 and 10, the channel resistance of the switching transistors and the frequency of the drive signals A and B applied to the switching transistors must be taken into account.

Figure 3:
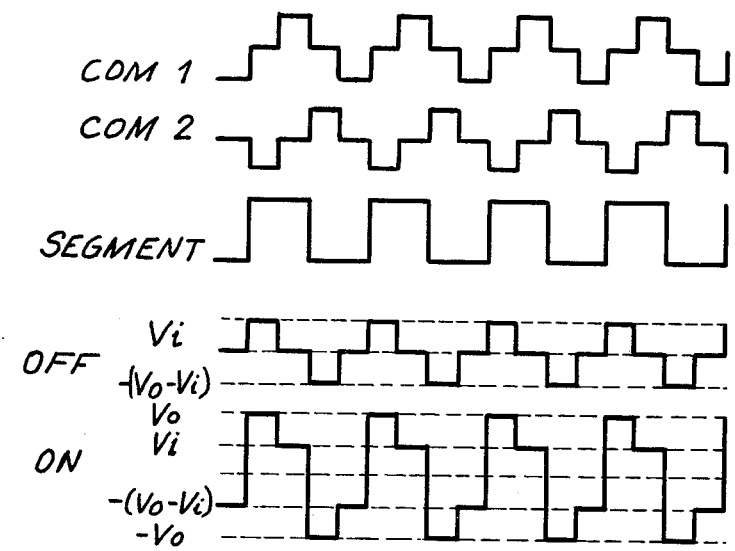
FIG. 3 is a wave diagram illustrating the manner in which a booster circuit, of the type depicted in FIG. 1, is utilized to generate signals for driving an electro-optical digital display.

This is particularly the case when the booster circuit is utilized to produce drive signals for effecting a multiplex driving of an electro-optical liquid crystal display. For example, as illustrated in FIG. 3, when voltage magnitudes of $-V_i$ and $-V_o$ are utilized to effect a ½ duty ratio driving of a liquid crystal display, if the difference between the magnitude of $V_o - V_i$ and the magnitude of $V_i$ is not considerable, a direct current will be applied to the liquid crystal display cells, and thereby considerably shorten the useful life thereof. It is noted that a liquid crystal digital display driven in a multiplexing mode, utilizing a ½ duty ratio, requires two two-phase signals COM 1 and COM 2 to be applied to the common electrode so that a first segment can be turned ON when COM 1 is applied thereto and the other segment can be turned OFF when COM 2 is simultaneously applied thereto. Accordingly, as is apparent from FIG. 3, if the difference in magnitude between $V_o - V_i$ and $V_i$ is not sufficient, a direct current will drive the display cell, whether the display cell is turned ON or turned OFF.

Figure 4:
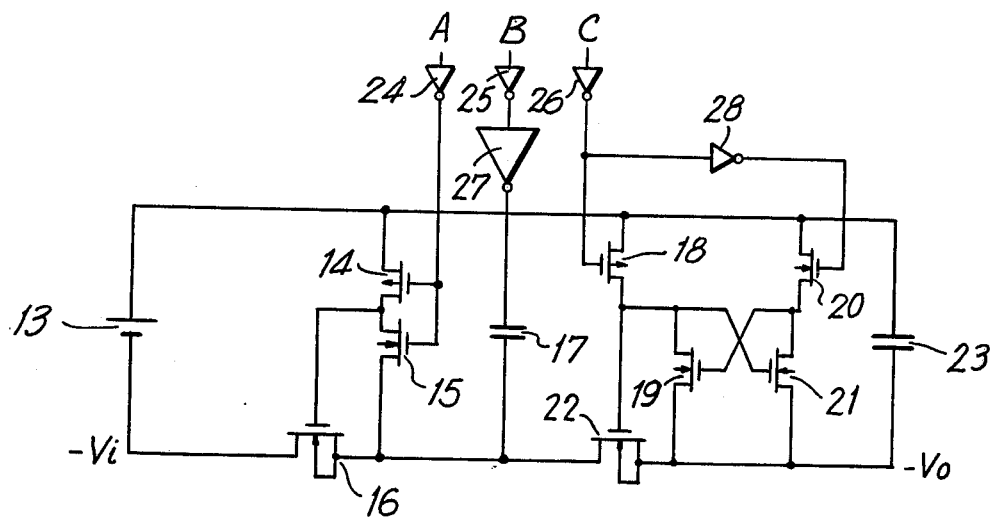
FIG. 4 is an illustration of a booster circuit constructed in accordance with the prior art.
Figure 5:
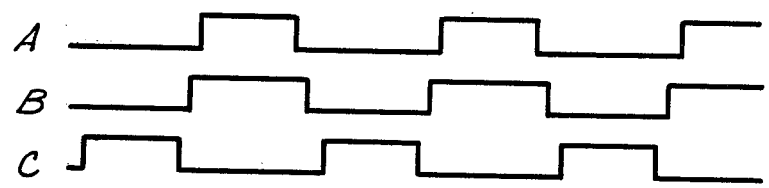
FIG. 5 is a wave diagram illustrating the operation of the booster circuit depicted in FIG. 4.

Reference is now made to FIG. 4, wherein a conventional booster circuit, including MOS switching transistors, is depicted. Reference is also made to FIG. 5, wherein the signals for driving the booster circuit, depicted in FIG. 4, are illustrated. It is noted that the booster circuit, depicted in FIG. 4, operates in the same manner discussed above with respect to the equivalent circuit depicted in FIG. 1.

Specifically, in order to obtain an output voltage that is of a sufficient magnitude to drive an increased load, it is necessary to reduce the ON resistance of each of the MOS switching transistors 16, 22 and the MOS switching transistors forming the C-MOS inverter circuit 27. Alternatively, the frequency of the drive signal A, B and C can be increased, to thereby maintain the output voltage produced by the booster circuit for driving an increased load. On the other hand, the magnitude of the output voltage produced by the booster circuit can be increased by increasing the size of the capacitors. Nevertheless, an increase in the size of the capacitors will cause a likewise unacceptable increase in the size of the electronic instrument, and hence is not acceptable in a small-sized electronic instrument such as a wristwatch.

It is noted that in FIG. 4, the voltage supply 13 produces a voltage $-V_i$, which voltage is utilized to charge a capacitor 17 in the same manner noted above. Specifically, drive signals A and B are applied through inverters 24 and 25, respectively, to a C-MOS inverter comprised of P-channel transistor 14 and N-channel transistor 15 for controlling switching transistor 16, and C-MOS inverter 27, which inverter is utilized to control the direction in which capacitor 17 is coupled. The C-MOS inverter 27 is depicted in detail in FIG. 6, wherein a preferred embodiment of the instant invention is illustrated. Drive signal C is out of phase with respect to drive signals A and B in order to control switching transistor 22. Drive signal C is applied through an inverter 26 to a flip-flop circuit comprised of transistors 18 and 20, inverter 28, and transistors 19 and 21, to thereby assure that switching transistor 22 is alternately turned ON and OFF, and hence also assure that the output voltage $-V_o$ is produced at the output capacitor 23.

Accordingly, as aforenoted, if the booster circuit is to produce a sufficient output voltage for driving an increased load, either the channel resistance of the MOS switching transistors 16, 22 and transistors comprising C-MOS inverter 27 can be reduced during fabrication or, alternatively, the frequency of each of the drive signals A, B and C can be increased. It is noted, however, that reducing the channel resistance of the switching transistors or increasing the frequency of the drive signals will result in a substantial increase in the current consumed by the booster circuit during operation, and thereby increase the rate at which the battery is dissipated. The instant invention eliminates this defect by increasing the current consumed by the booster circuit when the load, driven by the booster circuit, is increased. Stated otherwise, when an increased load is to be driven by the booster circuit, the impedance of the switching transistors can be selectively reduced by selectively reducing the channel resistance or increasing the frequency of the drive signals to thereby increase the current consumed by the booster circuit for the period that the increased load must be driven.

Figure 6:
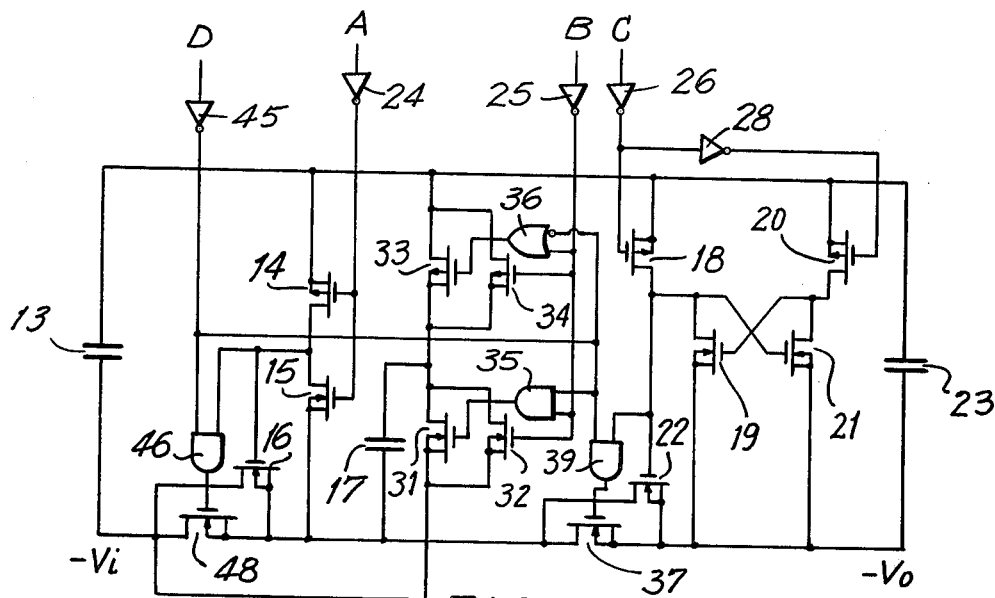
FIG. 6 is a detailed circuit diagram of a booster circuit constructed in accordance with a preferred embodiment of the instant invention.

Reference is now made to FIG. 6, wherein a booster circuit, constructed in accordance with a preferred embodiment of the instant invention, is depicted, like reference numerals being utilized to denote like elements described above. It is noted that the drive signals A, B and C, illustrated in FIG. 5, are utilized to drive the booster circuit depicted in FIG. 6 in the same manner described above with respect to the booster circuit depicted in FIG. 4 and the equivalent circuit depicted in FIG. 1. Additionally, a binary state load detection signal D is applied through an inverter 45 when the load to be driven by the booster circuit is increased. To this end, a voltage detection circuit of the type depicted in FIG. 7 can be utilized to detect when an increased load is placed upon the voltage supply. Accordingly, the voltage detection signal D is an HIGH level binary state signal when the current consumed by the electronic instrument is small and, hence, a small load is placed upon the booster circuit, and is a LOW binary state signal when the current consumed by the electronic instrument is increased, thereby placing a greater load on the booster circuit. It is noted that C-MOS switching transistors 34 and 32 represent the C-MOS inverter 27, illustrated in FIG. 4, and in combination with MOS switching transistors 16 and 37, as well as the flip-flop circuitry comprised of switching transistors 18, 19, 20 and 21 and inverter 28, produce a predetermined output voltage for driving a load in the same manner as the equivalent circuit illustrated in FIG. 1. Specifically, when drive signals A and B are in a positive cycle, switching transistors 16 and 34 are turned ON to thereby define a closed loop for charging capacitor 17 including voltage supply 13, transistor 34, capacitor 17 and transistor 26. Thereafter, when drive signal B is a LOW level signal, switching transistor 34 is turned OFF and switching transistor 32 is turned ON. Moreover, when the drive signal B is an LOW binary state signal, and the drive signal C is a HIGH binary signal, the flip-flop circuit turns switching transistors 22 ON to thereby define a second current loop, including voltage supply 13, output capacitor 23, switching transistor 22, capacitor 17 and switching transistor 32. As in the equivalent circuit discussed above, the second closed loop results in the supply voltage and the voltage stored in the capacitor 17, by the first closed loop, to be summed and applied to the output capacitor 23 as an output voltage for driving a load.

Coupled in parallel with each of the four switching transistors 16, 32, 34 and 22 are switching transistors 48, 31, 33 and 37, respectively. Switching transistors 48, 31, 33 and 37 are provided with a low ON channel resistance which is adapted to be coupled in parallel with the channel resistance of the MOS transistors 16, 32, 34 and 22, in response to a LOW level load detection signal D being produced. Specifically, load detection signal D is applied through inverter 45 to the first input of AND gate 46, AND gate 35, AND gate 39 as an inverted input to a NOR gate 36. AND gate 46, AND gate 35, AND gate 39 and NOR gate 36 are respectively coupled to the control electrodes of switching transistors 48, 31, 37 and 33, respectively. The other input of AND gate 46, AND gate 35, AND gate 39 and NOR gate 36 is the switching signal utilized to control the switching transistors 16, 32, 34 and 22. Thus, for example, when a LOW level load detection signal D is produced, in response to an increased load being placed upon the booster circuit, a HIGH level input is applied to AND gate 46, AND gate 35, AND gate 39 and a LOW level input is applied to NOR gate 36, to thereby cause switching transistors 48, 31, 37 and 33 to be respectively controlled in response to the drive signals applied to switching transistors 16, 32, 22 and 33, respectively. Accordingly, when switching transistors 16 and 34 are turned ON, and an increased load is detected, transistors 48 and 33 will also be turned ON, to thereby couple the low channel resistance of transistors 48 and 33 in parallel with the channel resistance of switching transistors 16 and 34, to thereby decrease the resistance of the switching transistors, and hence increase the current consumption of the booster circuit. Similarly, when switching transistors 32 and 37 are turned ON, and an increased load is placed upon the booster circuit, LOW level load detection signal D will cause transistors 31 and 37 to be turned ON simultaneously with switching transistors 32 and 22, and thereby couple the low channel resistance of transistors 31 and 37 in parallel with respect to channel resistances of transistors 32 and 22 and thereby effect a reduction in the resistance of the loop summing the voltages in the output capacitor 23, and hence increase the current consumed by the booster circuit. Nevertheless, once the additional load is removed from the booster circuit, a HIGH level load detection signal D is applied through inverter 45 to thereby inhibit transistors 48, 31, 33 and 37 and thereby turn same OFF so that the booster circuit can return to a normal operating mode of the type described above. Thus, by selectively coupling the channel resistances defined by each of the MOS transistors disposed in parallel with switching transistors 16, 32, 34 and 22, when an additional load is to be driven by the booster circuit, the resistance of the booster circuit will be temporarily lowered, thereby resulting in an increase in the current consumed by the booster circuit, and thereby permitting the booster circuit to continue to produce a sufficient output voltage $-V_o$ for driving the additional load.

Figure 7:
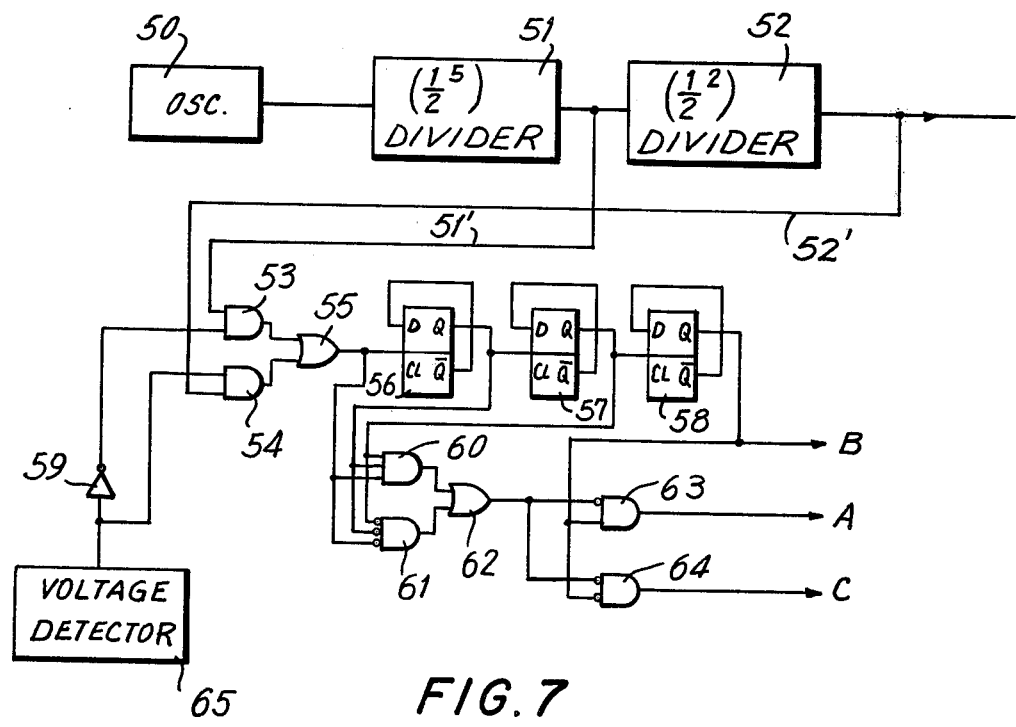
FIG. 7 is a circuit diagram of a booster circuit constructed in accordance with a further embodiment of the instant invention.

Reference is now made to FIG. 7, wherein an electronic wristwatch, including a booster circuit constructed in accordance with a further embodiment of the instant invention, is depicted. The electronic wristwatch includes an oscillator circuit 50 having a high frequency time standard such as a quartz crystal vibrator or the like for applying a high frequency time standard signal to a $\frac{1}{2}^5$ divider circuit 51 comprised of five series-connected binary divider stages. Divider 51 divides down the high frequency time standard signal and produces an intermediate frequency signal 51', which signal is applied as a first input to an AND gate 53. Intermediate frequency signal 51' is further applied to a $\frac{1}{2}^2$ divider 52 comprised of two series-connected binary divider stages. Divider 52 divides down intermediate frequency signal 51' and produces a lower frequency intermediate signal 52', which signal is applied as a first input to AND gate 54. A voltage detector is adapted to apply a load detection signal to a second input of AND gate 54 and through an inverter circuit 59 to the second input of AND gate 53. An OR gate 55 is coupled to the outputs of AND gates 53 and 54 to thereby define a selector circuit for selecting the higher intermediate frequency signal 51', or the lower intermediate frequency signal 52' to be transmitted to the D-flip-flops 56, 57 and 58 and the AND gates 60 and 61. Specifically, when the load detection signal is a HIGH level signal the higher frequency signal 52' will be gated through AND gate 54, and when the load detection signal is a LOW level signal, the higher intermediate frequency signal 51' will be gated through AND gate 53. D-flip-flops 56, 57 and 58, as well as AND gates 60, 61, 63, 64 and OR gate 62 are utilized to synthesize the drive signals A, B and C, which drive signals are illustrated in FIG. 5. It is noted, however, that the frequency of the drive signals will be varied in accordance with the frequency of the intermediate frequency signal transmitted through OR gate 55. Thus, during normal operating conditions, when a small load is driven by the booster circuit, the lower intermediate frequency signal 52' is applied through OR gate 55, to thereby reduce the frequency of the drive signals A, B and C produced thereby. However, when an increased load is detected, the higher intermediate frequency signal 51' is transmitted through OR gate 55 to thereby increase the frequency of the drive signals A, B and C, and hence decrease the impedance of each of the switching transistors. Specifically, if, for example, in the circuit of FIG. 4, the frequency of the drive signals is increased, the impedance of the switching transistors will be decreased, thereby causing an increase in the current consumed by the booster circuit, and hence insuring that a suitable output voltage will be applied to the load.

Accordingly, the embodiments illustrated in FIGS. 6 and 7 each permit a temporary increase in the current consumption of the booster circuit when an additional load is to be driven, and thereby permits a sufficient boosted voltage $-V_o$ to be produced at that time. This type of booster circuit is particularly suitable for use in a multifunctional electronic wristwatch of the type capable of being utilized as a calculator or as a stopwatch. For example, when the timepiece is being operated as a calculator, the load driven by the booster circuit would be small, and hence a small capacity battery can be utilized. Nevertheless, for the short intervals of time that the wristwatch would be operated as a calculator, the impedance of the booster circuit can be decreased, to thereby temporarily increase the current consumption of the booster circuit, and thereby maintain the boosted voltage at a sufficient magnitude to drive the increased load for the short interval of time that the wristwatch is utilized as a calculator.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. In a booster circuit including a voltage supply for producing a predetermined supply voltage, a first capacitor, a second capacitor, switching means adapted to be disposed in a first operative mode to apply said supply voltage to said first capacitor and charge same to a first voltage, said switching means being adapted to be disposed in a second operative mode for applying said supply voltage and said first voltage stored in said first capacitor to the second capacitor to produce a predetermined output voltage for driving a load substantially equal to the sum of said supply voltage and said first voltage stored in said first capacitor, the improvement comprising load detection means for producing a load detection signal in response to a change in the load driven by said output voltage, and circuit means coupled to said switching means for controlling the impedance of said switching means in response to said load signal being applied thereto, whereby said current consumed by said booster circuit is varied in response to said load detection signal.

2. A booster circuit as claimed in claim 1, wherein said circuit means includes second switching means adapted to be coupled in parallel with said first-mentioned switching means in response to said load detection signal being applied thereto, to thereby reduce the resistance of said first switching means and thereby increase the current consumed by the booster circuit.

3. A booster circuit as claimed in claim 1, wherein said circuit means coupled to said switching means includes means for generating a high frequency signal for driving said switching means, to thereby increase the frequency at which said switching means is alternately disposed in said first and second mode, to thereby reduce the impedance of said switching means and thereby increase the current consumed by said booster circuit.

4. A booster circuit as claimed in claim 1, wherein said switching means includes at least first and second transistor switching means, said first transistor switching means being disposed intermediate said voltage supply and said first capacitor for selectively supplying said supply voltage to said first capacitor, and said second transistor means being disposed intermediate said second capacitor and said first capacitor for selectively applying said supply voltage and said voltage stored in said first capacitor to said second capacitor to produce said predetermined output voltage for driving said load.

5. A booster circuit as claimed in claim 4, wherein said impedance means includes third transistor means and fourth transistor means adapted to be respectively coupled in parallel with said first transistor means and second transistor means in response to said load detection signal being applied thereto, to thereby decrease the resistance of said booster circuit and hence selectively increase the current consumed thereby.

6. A booster circuit as claimed in claim 5, wherein said first switching transistor means includes a first and second MOS switching transistor coupled to said first capacitor to selectively define a first current loop including said voltage supply, a first MOS switching transistor, said first capacitor and said second MOS switching transistor.

7. A booster circuit as claimed in claim 6, wherein said second switching transistor means includes third and fourth MOS switching transistors, said third MOS switching transistor being disposed intermediate said first capacitor and said voltage supply, said fourth MOS switching transistor being coupled intermediate said second capacitor and said first capacitor to selectively define a second current loop comprised of said voltage supply, said third MOS switching transistor, said first capacitor, said fourth MOS switching transistor and said second capacitor.

8. A booster circuit as claimed in claim 7, wherein said third transistor means and said fourth transistor means include fifth, sixth, seventh and eighth MOS switching transistors adapted to be respectively coupled in parallel with said first, second, third and fourth MOS switching transistors in response to said load detection signal being applied thereto.

9. A booster circuit as claimed in claim 8, wherein each of said fifth, sixth, seventh and eighth MOS switching transistors have a lower channel resistance than said first, second, third and fourth MOS switching transistors to which same are adapted to be coupled in parallel therewith.

10. A booster circuit as claimed in claim 4, and including divider means for producing a first intermediate frequency signal and a second intermediate frequency signal having a lower frequency than said first intermediate frequency signal, and logic means adapted to receive said load detection signal and said first and second intermediate frequency signals, said logic means being coupled to said circuit means for increasing the frequency at which the first and second transistor switching means are alternately disposed in a first and second mode in accordance with said first intermediate frequency signal in response to a load detection signal being applied thereto, said logic means being adapted to alternately dispose said first and second switching means in said first and second mode in accordance with said second lower frequency signal in the absence of a load detection signal applied to said logic means.

* * * * *